(12) United States Patent
Umeda

(10) Patent No.: US 8,737,850 B2
(45) Date of Patent: May 27, 2014

(54) INSPECTION APPARATUS, INSPECTION METHOD, INSPECTION SYSTEM, AND STORAGE MEDIUM

(75) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/494,732

(22) Filed: Jun. 12, 2012

(65) Prior Publication Data

US 2012/0321327 A1 Dec. 20, 2012

(30) Foreign Application Priority Data

Jun. 14, 2011 (JP) ................................. 2011-132280

(51) Int. Cl.
*G03G 15/00* (2006.01)

(52) U.S. Cl.
USPC ........................................................... 399/15

(58) Field of Classification Search
USPC .......... 399/9, 15; 358/1.9, 504, 515; 382/112, 382/162, 167, 173, 312
See application file for complete search history.

(56) References Cited

U.S. PATENT DOCUMENTS 7,486,414 B2 * 2/2009 Arai ............................... 358/1.9
8,150,106 B2 * 4/2012 Wu et al. ........................ 382/112

FOREIGN PATENT DOCUMENTS

JP 2000-123176 A 4/2000

* cited by examiner

*Primary Examiner* — Hoan Tran
(74) *Attorney, Agent, or Firm* — Canon U.S.A., Inc. IP Division

(57) ABSTRACT

A special color specification area is subjected to inspection processing assuring that the special color specification area is higher in color reproducibility than an area other than the special color specification area.

14 Claims, 6 Drawing Sheets

INSPECTION APPARATUS, INSPECTION METHOD, INSPECTION SYSTEM, AND STORAGE MEDIUM

BACKGROUND OF THE INVENTION

1. Field of the Invention

The present invention relates to an inspection apparatus, an inspection method, an inspection system, and a storage medium and in particular to a processing technique for determining whether defective printing exists in a printed image.

2. Description of the Related Art

In recent years, a market called print on demand (hereinafter referred to as POD) has appeared. In the POD market, the use of a digital image forming apparatus (hereinafter referred to as an image forming apparatus) such as a digital copying machine and a digital multifunction peripheral, for example, realizes digital print using electronic data to enable print service to be performed.

In the digital print, an inspection apparatus is connected to the image forming apparatus to inspect whether a printing error, missing page or dirt in a print product delivered to a customer exists in-line. An in-line inspection processing allows the output processing of a print product to be changed depending on results of the inspection processing. For example, a print product, which is determined defective as a result of the inspection processing, can be output to a tray different from a tray for a non-defective article.

Laid-Open Japanese Patent Application No. 2000-123176 discusses a technique for inspecting a print product such that a reference image for inspecting the print product is compared with a scan image read by imaging the print product. The inspecting processing discussed in Laid-Open Japanese Patent Application No. 2000-123176 is one that a difference in tint between the scan image and the reference image is calculated to inspect the tint of the print product (hereinafter referred to as tint inspection).

Methods for specifying the color of the print product to be printed and output by the image forming apparatus include a method for specifying the color by a color mixture ratio among red (R), green (G), and blue (B), or among cyan (C), magenta (M), yellow (Y), and black (K), and a method for specifying the color by a color number or a color name given by of a color sample. The color sample is often simply called a color chart. In the latter method, a correspondence in values between the color number (or the color name) of the color sample and CMYK (or RGB) for representing colors indicated by the number (color name) is clearly defined by a print industry. In general, a user who wants to reproduce the color of the print product as faithfully as possible by the color of the color sample selects and specifies the color in the color sample.

The user who specifies color in an area by selecting the color in the color sample wants to reproduce the color of the color sample faithfully, so the user wants to sufficiently inspect the height of reproducibility of the color in the area. On the other hand, the area where the color in the color sample is not specified does not need to be higher in color reproducibility than the area where the color in the color sample is specified. For this reason, the tint inspection does not always need to be conducted using the same standard in the area where color is specified by the color mixture ratio and the area where color is specified by the color sample.

However, Laid-Open Japanese Patent Application No. 2000-123176 does not distinguish the area where color is specified by the color mixture ratio of RGB or CMYK and the area where color is specified by the color sample in the generated reference image, so that the processing contents of the tint inspection are not changed according to the area.

SUMMARY OF THE INVENTION

The present invention relates to a technique for changing tint inspection processing according to an area such that only an area where color is specified by a color sample is subjected to a highly accurate tint inspection.

According to an aspect of the present invention, an inspection apparatus includes a reading unit configured to read a print product printed by an image forming apparatus to acquire a scan image, an acquiring unit configured to acquire a reference image with a plurality of object areas as a reference to the scan image, and a determination unit configured to determine, according to a criterion, whether the print product is acceptable by comparing the scan image with the reference image in the plurality of the object areas, wherein the criterion with respect to a special color specification area among the plurality of the object areas is stricter than the criterion with respect to an object area other than the special color specification area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
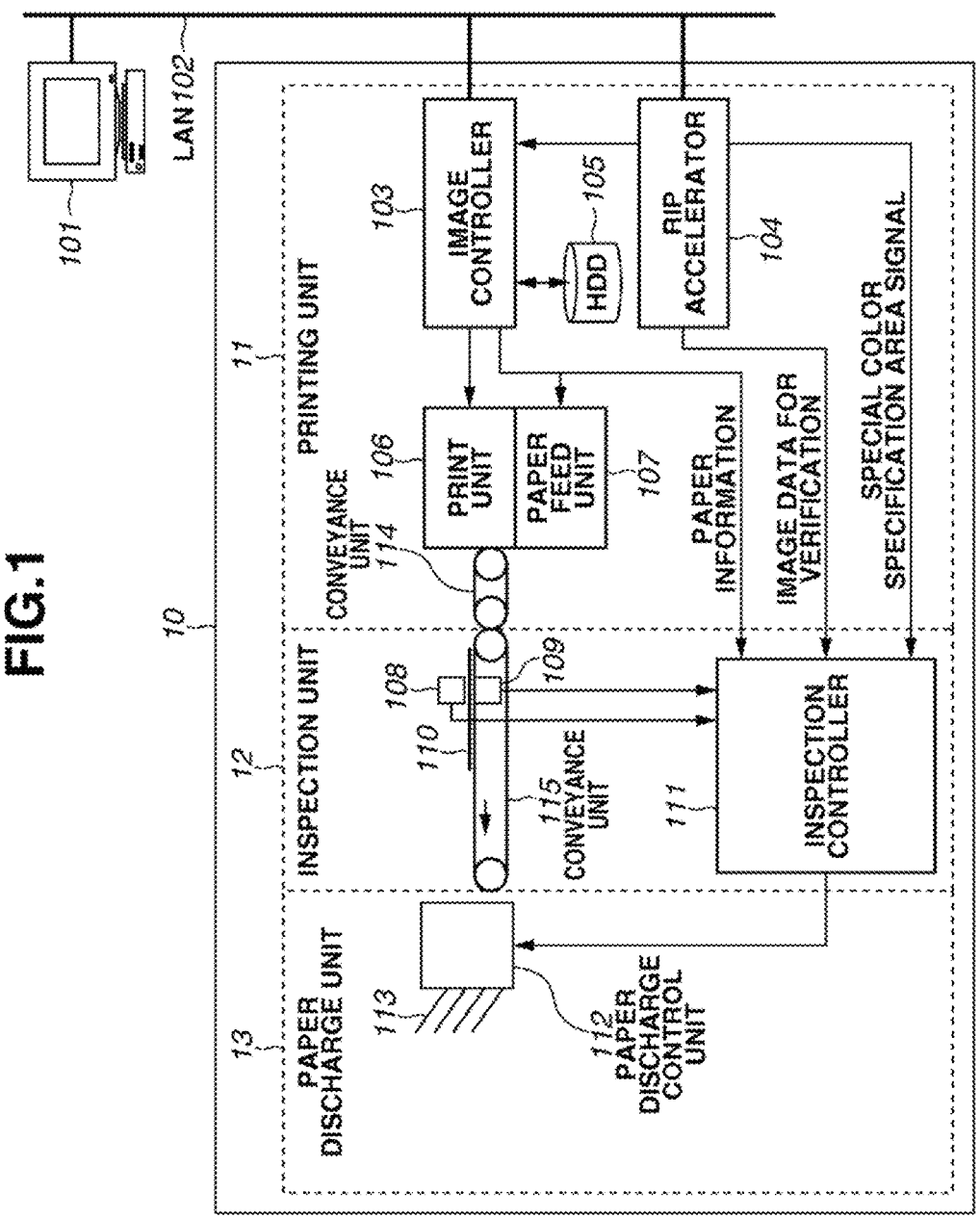
FIG. 1 is a block diagram illustrating a configuration of an image forming system according to a first exemplary embodiment of the present invention.

FIG. 1 is a block diagram illustrating a configuration of an image forming apparatus (an inspection system) capable of inline inspection processing according to a first exemplary embodiment. The configuration of the image forming apparatus according to the first exemplary embodiment is described below with respect to FIG. 1.

In FIG. 1, a computer 101 creates a document to be printed. The image data printed by the image forming apparatus is generated by the computer 101. In the present exemplary embodiment, the computer (information processing apparatus) 101 generates page description language (PDL) data as image data. When the image data is generated, a user can specify color to be printed by a color mixture ratio among RGB and CMYK, color to be printed using the color sample, or special color previously prepared by an application or the image forming apparatus (hereinafter, the thus specified color is referred to as a special color).

A local area network (LAN) 102 connects the computer 101 with the image forming apparatus. The image data and various types of information are transferred between the computer 101 and the image forming apparatus via the local area network 102.

In FIG. 1, an image forming system 10 is capable of inline inspection processing according to the present exemplary embodiment and includes a printing unit 11, an inspection unit 12, and a paper discharge unit 13. The printing unit (the image forming apparatus) 11 rasterizes the image data acquired from the computer 101 to convert the image data into bitmap data and prints the image data on a sheet of recording paper to produce a print product. Further, the printing unit generates reference image data for inspection and outputs the reference image data to the inspection unit 12.

The inspection unit (the inspection apparatus) 12 acquires the print product and the reference image data output from the printing unit 11 and compares scan image data, which is acquired by reading the print product printed by the printing unit 11, with the reference image data to perform the inspection processing. The inspection unit 12 outputs the print product subjected to the inspection processing to the paper discharge unit 13 based on the results of the inspection processing (results determined by the inspection). The inspection unit 12 includes a conveyance unit for conveying the print product output by the printing unit 11 from the printing unit 11 to the paper discharge unit 13.

The paper discharge unit (a sheet processing apparatus) 13 receives the inspection results (results determined by the inspection) from the inspection unit 12 and performs control so that the print product is transmitted to a designated output tray (outside the apparatus) and discharged based on the received inspection results. In other words, the paper discharge unit 13 includes a result reception unit for receiving the inspection results of the inspection unit 12 and a discharge unit for discharging the print product to the output tray.

The configuration of each unit is described in detail below.

In the printing unit 11, an image controller 103 transmits bitmap image data generated by a raster image processing (RIP) accelerator 104 to a print unit 106 at a subsequent stage. The image controller 103 also transmits information about the types of paper for selecting paper on which the bitmap image data is printed and for correcting an image according to the types of paper in an inspection controller 111 to a paper feed unit 107 and the inspection controller 111. The printing unit 11 stores the image data (PDL data) input from the information processing apparatus via the local area network 102 in a hard disk drive (HDD) 105 and subjects the image data to various types of editing processing such as compression, decompression, reduction, expansion, inversion, rotation, N-in-1 print, and color conversion. The PDL data contains information describing a plurality of image objects such as characters and graphics.

The RIP accelerator 104 connected to the computer 101 via the local area network 102 rasterizes the document described in the PDL transmitted from the computer 101 to generate bitmap image data. The PDL includes a command (rendering command) expressing that color is specified using the color sample or the special color is specified. When detecting the command, the RIP accelerator 104 generates the bitmap image data based on the color corresponding to the color sample or the special color in an area of the image object corresponding to the command. The generated bitmap image data is output to the print unit 106 via the image controller 103 and printed on the recording paper.

The RIP accelerator 104 transmits the generated bitmap image data as the reference image data (image data for verification) to the inspection controller 111. In other words, the RIP accelerator 104 functions as an image transmission unit. In the present exemplary embodiment, the reference image data includes a plurality of object areas such as characters and graphics, and the command in the PDL is specified to the object areas.

The RIP accelerator 104 detects the command expressing that color is specified using the color sample or the special color is specified, i.e., the command expressing a predetermined attribute and then outputs information (special color specification area signal) expressing that the object includes the predetermined attribute. The special color specification area signal is set in the corresponding object area in the reference image data and is information for identifying whether the object area is the one that the special color is specified. The object area in the reference image data corresponds to the object area of the PDL corresponding to the command.

While the RIP accelerator 104 is outputting the image data in which the color is specified using the color sample or the special color is specified as the reference image data, the special color specification area signal is transmitted to the inspection controller 111 (i.e., an area information reception unit) in synchronization with the reference image data. In other words, the RIP accelerator 104 functions as an information transmission unit.

The HDD 105 serving as a storage device stores a program for operating the image controller 103 and the image data input to the image forming apparatus via the local area network 102. The image data stored in the HDD 105 is transmitted to the local area network 102 via the image controller 103 and subjected to various types of the editing processing in the image controller 103.

The print unit (printing unit) 106 prints the image data (the bitmap image data) transmitted from the image controller 103 on the recording paper sent from the paper feed unit 107 by an electrophotographic method or an inkjet method. The print unit 106 includes a conveyance unit 114 for conveying the printed recording paper to the inspection unit 12.

The paper feed unit 107 selects the paper whose type and size are specified based on information about types of paper transmitted from the image controller 103 and sends the paper to the print unit 106.

In FIG. 1, a sheet of recording paper 110 is the one on which the print unit 106 prints the image data. The recording paper 110 on which the print unit 106 prints the image data (the bitmap image data) as a print product is input to the inspection unit 12 by the conveyance unit 114. Then a conveyance unit 115 conveys the recording paper 110 inputted from the printing unit to positions of scanners (reading units) 108 and 109. The scanners, as an image reading apparatus described below, read the image printed on the recording paper 110. Then, the conveyance unit 115 conveys the recording paper 110 read by the scanners to the paper discharge unit 13. In the conveyance of the print product from the printing unit 11 to the paper discharge unit 13, the conveyance unit of the inspection unit 12 conveys the print product to a reading position of each of the scanners 108 and 109 to read the print product by the scanners 108 and 109. More specifically, the recording paper 110 is input to the inspection unit 12, read by the scanners 108 and 109, and then transmitted to the paper discharge unit 13 by a supporting member and the conveyance unit, which are not illustrated.

The scanners (scan image acquisition units) 108 and 109 read the image printed on the recording paper 110. The scanners 108 and 109 are arranged on a position facing the recording paper 110 and capable of simultaneously reading the front and rear surfaces of the recording paper 110. The scanners 108 and 109 are fixed to the inspection unit 12, and scan the front and rear surfaces of the recording paper 110 while the recording paper 110 is moving between the scanners 108 and 109. The image data (the scan image data) read by the scanners 108 and 109 is transmitted to the inspection controller 111 to inspect the printed document.

The inspection controller (a reference image acquisition unit) 111 acquires the scan image data read by the scanners 108 and 109 and the reference image data transmitted from the RIP accelerator 104 and compares these data pieces with each other to perform the tint inspection processing. In other words, the inspection controller 111 functions as a determination unit for determining whether the print product is accepted or rejected. When the special color specification area signal is received from the RIP accelerator 104, the inspection controller 111 performs the tint inspection processing specific to the special color specification area (which is different from other areas). In other words, the inspection controller 111 functions as a special color specification reception unit.

The scanners 108 and 109 input the image data pieces on the front and rear surfaces of the recording paper 110, however, if the image data only on the one surface is printed on the recording paper 110, for example, the inspection controller 111 performs the tint inspection processing using only the image data transmitted from the corresponding scanner.

The tint inspection processing performed by the inspection controller 111 is described in detail below with reference to a flow chart. When the inspection controller 111 finishes the tint inspection processing, the inspection controller 111 outputs tint inspection results to a paper discharge control unit 112.

In the paper discharge unit 13, the paper discharge control unit 112 selects a predetermined output destination from among a plurality of output destinations (fins) included in a paper discharge tray 113 and outputs the recording paper 110 transmitted from the inspection unit 12 to the selected output destination. The output destination of the recording paper 110 is set using a user interface (UI, not illustrated) connected to the computer 101 and the image controller 103.

The paper discharge control unit 112 also changes the output destination according to the tint inspection results output by the inspection controller 111. According to this configuration, the paper discharge control unit 112 outputs the recording paper determined as acceptable and the one determined as unacceptable by the inspection controller 111 among the sheets of the recording paper transmitted by the inspection unit 12 to different output destinations, so that an acceptable product and an unacceptable product are automatically sorted out one from the other.

The paper discharge tray 113 is connected to the paper discharge control unit 112 and includes a plurality of the output destinations (fins). The paper discharge tray 113 distributes and outputs the transmitted recording paper 110 to the plurality of the output destinations. Therefore, when a plurality of copies of the same document is printed, for example, the document can be separated for each copy by being output to destinations different for each copy. As described above, the paper discharge tray 113 automatically sorts out the recording paper 110 determined as acceptable from the recording paper 110 determined as unacceptable based on the tint inspection results.

[Tint Inspection Processing]

Figure 2:
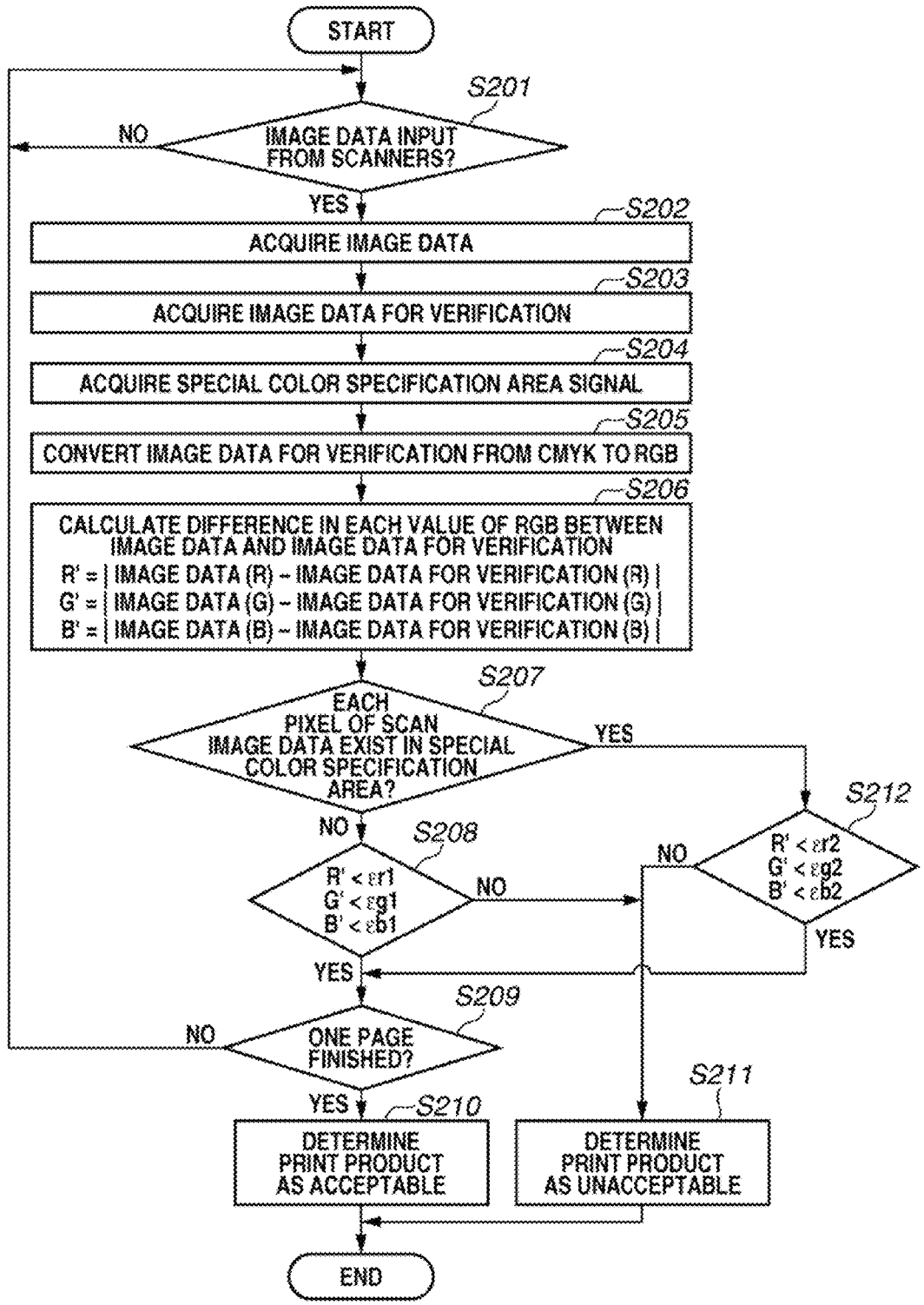
FIG. 2 is a flow chart illustrating tint inspection processing of an inspection controller 111 according to the first exemplary embodiment.

FIG. 2 is a flow chart illustrating an operation in which the inspection controller 111 in FIG. 1 subjects one-page print product to the tint inspection.

In step S201, the inspection controller 111 waits for an input of scan image data from the scanners 108 and 109. If the scan image data is input (YES in step S201), in step S202, the inspection controller 111 acquires the scan image data.

In steps S203 and S204, the inspection controller 111 acquires the reference image data corresponding to the acquired scan image data from the RIP accelerator 104. The inspection controller 111 also acquires a special color specification area signal about each pixel of the reference image data from the RIP accelerator 104.

The reference image data and the special color specification area signal may be input from the RIP accelerator 104 in synchronization with the image data input from the scanners 108 and 109. In other words, the processing in steps S202 to S204 may be performed in parallel. The reference image data and the special color specification area signal may be input before scanning is performed. In other words, the processing steps S203 and S204 may be performed previous to the processing in step S202.

If the scan image data and the reference image data acquired in steps S202 and S203 are different in format from each other, the format(s) of both data need to be conformed with each other. In general, scan image data read by a scanner is represented in red (R), green (G), and blue (B). On the other hand, the print data generated by the RIP accelerator 104 and used as the reference image data at the time of the inspection processing is represented in CMYK because an image is formed by toners of cyan (C), magenta (M), yellow (Y), and black (K) in the print unit 106. In step S205, for this reason, the reference image data input to the inspection controller 111 and represented in CMYK is converted into RGB data in the processing in the flow chart illustrated in FIG. 2. If the RIP accelerator 104 has already converted the CMYK data into the RGB data and transmitted the RGB data to the inspection controller 111, the processing in step S205 is not performed. In the present exemplary embodiment, the reference image data is converted into the RGB data to conform the format thereof to that of the scan image data, however, conversely, the format of the scan image data may be conformed to that of the reference image data (the CMYK data, for example).

After the formats of the scan image data and the reference image data are conformed to each other in step S205, in step S206, the inspection controller 111 (a comparison unit) aligns the scan image data and the reference image data and compares data of each pixel with each other to calculate a difference (a difference value). In FIG. 2, each pixel is represented by the RGB data, so that a difference for each of the RGB data is calculated. If a difference of R data is R', a difference of G data is G', and a difference of B data is B', the difference is represented by the following equations.

$$R' = |R \text{ data of image data} - R \text{ data of reference image data}| \quad \text{Equation 1a}$$

$$G' = |G \text{ data of image data} - G \text{ data of reference image data}| \quad \text{Equation 1b}$$

$$B' = |B \text{ data of image data} - B \text{ data of reference image data}| \quad \text{Equation 1c}$$

Using equations 1a-1c, it is determined whether the scan image data is acceptable or not based on the difference value which is a comparison result obtained by the comparison processing.

When the difference value of each pixel is calculated, in step S207, the inspection controller 111 determines whether each pixel of the scan image data acquired in step S202 exists in the special color specification area in the reference image data with reference to the special color specification area signal acquired in step S204.

If the pixel does not exist in the special color specification area (NO in step S207, for example, the special color specification area signal=0), in step S208, the inspection controller 111 determines whether the respective difference values of the pixels of the scan image data to be inspected are smaller than thresholds $\epsilon r1$, $\epsilon g1$, and $\epsilon b1$.

The thresholds $\epsilon r1$, $\epsilon g1$, and $\epsilon b1$ are used to determine whether the print product is acceptable, based on if the differences between the scan image data and the reference image data are less than the thresholds $\epsilon r1$, $\epsilon g1$, and $\epsilon b1$ in the tint inspection processing. In step S208, the thresholds $\epsilon r1$, $\epsilon g1$, and $\epsilon b1$ represent the thresholds in portions other than the special color specification area.

In step S208, it is determined whether the scan image data is acceptable or not based on the results of comparison between the scan image data and the reference image data. More specifically, if the difference values R', G', and B' between the scan image data and the reference image data satisfy the criterion represented by Equation 2, then it is determined that the pixel as an inspection target in the scan image data acquired in step S202 is printed in tint within the predetermined range. The tint inspection processing of the pixel is then ended.

$$R'<\epsilon r1, G'<\epsilon g1, \text{ and } B'<\epsilon b1 \qquad \text{Equation 2}$$

When the tint inspection processing for the pixel as the inspection target in the scan image data acquired in step S202 is finished, in step S209, the inspection controller 111 determines whether the tint inspection processing is finished for image data of one page (i.e., all pixels of the scan image data).

If the tint inspection processing is not finished for the image data of one page (NO in step S209), the processing returns to step S201. The inspection controller 111 acquires pixels as the inspection target in the next scan image data from the next scanner and subjects the acquired scan image data to the tint inspection processing.

If the tint inspection processing is finished for the image data of one page (YES in step S209), in step S210, the inspection controller 111 (a determination unit) determines that the print product subjected to the tint inspection processing is acceptable and ends the processing for one page.

If the condition represented by Equation 2 is not satisfied (NO in step S208), in other words if the difference values are equal to or greater than the threshold values, the processing proceeds to step S211. In step S211, the inspection controller 111 determines that the image data acquired in step S202 is not printed in the tint within the predetermined range and the print product subjected to the inspection is unacceptable. Then, the inspection controller 111 ends the tint inspection processing.

If the scan image data exists in the special color specification area (for example, the special color specification area signal=1) as a result of referring to the special color specification area signal (YES in step S207), in step S212, the inspection controller 111 determines whether the difference values of the respective RGB data pieces are smaller than thresholds $\epsilon r2$, $\epsilon g2$, and $\epsilon b2$, where the thresholds $\epsilon r2$, $\epsilon g2$, and $\epsilon b2$ are smaller than those used in step S208. The thresholds $\epsilon r2$, $\epsilon g2$, and $\epsilon b2$ in step S212 represent thresholds in the special color specification area.

If the RGB data differences R', G', and B' between the image data and the reference image data satisfy the criterion represented by the Equation 3 (YES in step S212), then it is determined that the pixel as the inspection target in the scan image data acquired in step S202 is printed in the tint within the predetermined range. Then, the inspection controller 111 ends the tint inspection processing of the pixel.

$$R'<\epsilon r2, G'<\epsilon g2, \text{ and } B'<\epsilon b2 \qquad \text{Equation 3}$$

If the condition represented by Equation 3 is not satisfied (NO in step S212), in other words, if the difference value is equal to or greater than the threshold, the processing proceeds to step S211. In step S211, the inspection controller 111 determines that the pixel as the inspection target in the scan image data acquired in step S202 is not printed in the tint within the predetermined range and the print product subjected to the tint inspection is unacceptable. Then, the inspection controller 111 ends the tint inspection processing.

In the present exemplary embodiment, the thresholds $\epsilon r2$, $\epsilon g2$, and $\epsilon b2$ in the special color specification area used in step S212 are set to satisfy the following relationship between the thresholds $\epsilon r2$, $\epsilon g2$, and $\epsilon b2$ and the thresholds $\epsilon r1$, $\epsilon g1$, and $\epsilon b1$ in portions other than the special color specification area used in step S208:

$$\epsilon r2 < \epsilon r1$$

$$\epsilon g2 < \epsilon g1$$

$$\epsilon b2 < \epsilon b1 \qquad \text{Equation 4}$$

The threshold of determination in the special color specification area is smaller than the threshold of determination in the area other than the special color specification area. More specifically, it is assured that the criterion in the special color specification area is stricter than that in the area other than the special color specification area, and the color reproducibility in the special color specification area is higher than that in the area other than the special color specification area.

The thresholds are set as represented by Equation 4, so that the tint inspection processing determines the print product as unacceptable if the difference of each data between the scan image data and the reference image data in the special color specification area is not smaller than that in other areas. In other words, the thresholds are set as represented by Equation 4 and the tint inspection processing is performed to allow acquiring the print product of which color is nearer to that of the reference image data in the special color specification area than in other areas.

The tint inspection results obtained in determination steps S210 and S211 in the flow chart in FIG. 2 are output from the inspection controller 111 to the paper discharge control unit 112. The paper discharge control unit 112 performs control such as changing the output destination of the print product subjected to the tint inspection based on the tint inspection results.

[Color Selection]

Figure 3:
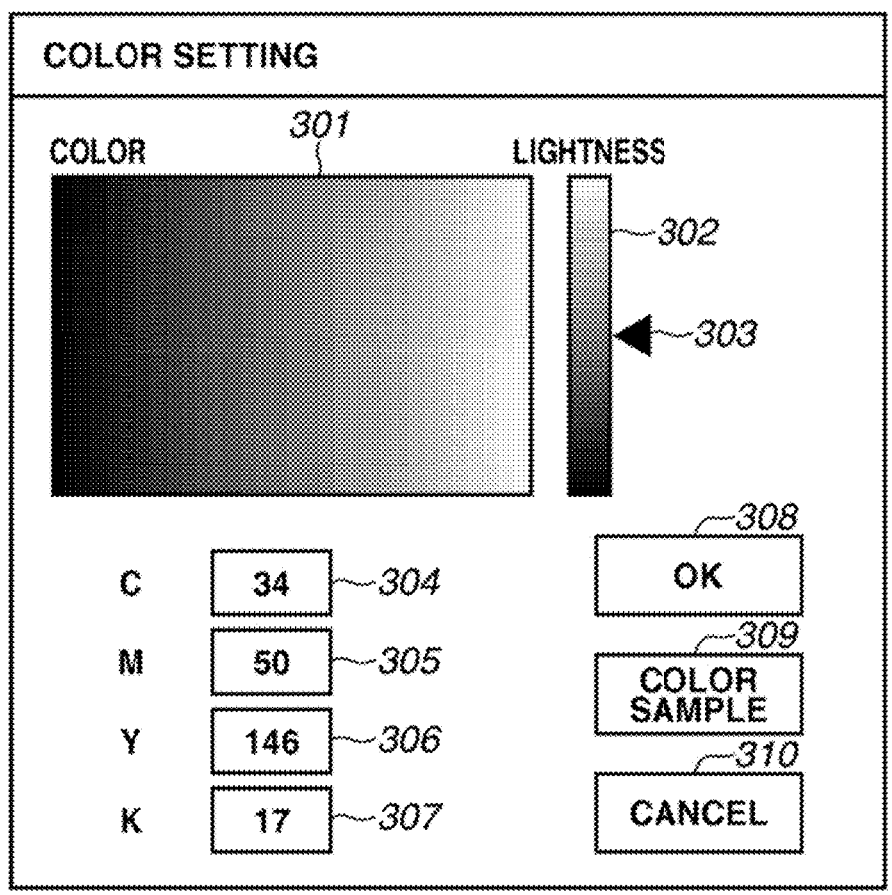
FIG. 3 is a schematic diagram illustrating a user interface for setting a color.
Figure 4:
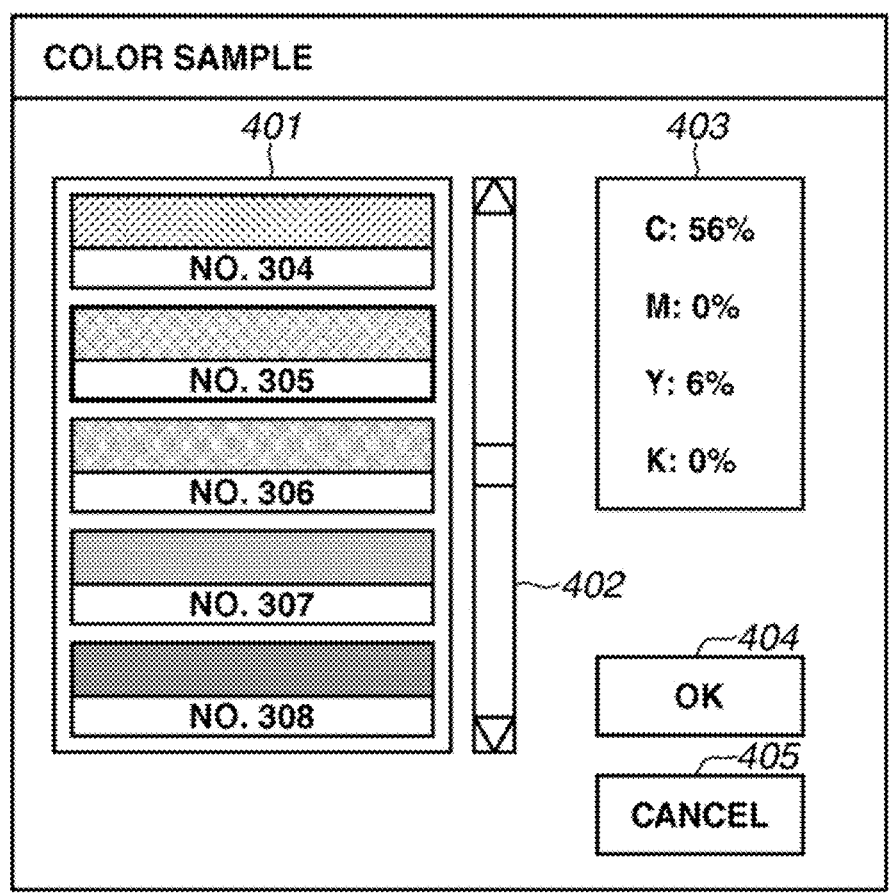
FIG. 4 is a schematic diagram illustrating a user interface for setting a color using a color sample.

An example of two types of methods for selecting a print color in the computer 101 is described below. The computer 101 offers to a user the methods for selecting the print color. One of the two types of the methods is described in FIG. 3, and another type of the methods using a color sample is described in FIG. 4. The color sample of the present exemplary embodiment includes color numbers indicating respective predetermined colors, as shown in FIG. 4. FIG. 3 is an example of a setting screen for setting color by an application operated on the computer 101. The setting screen is displayed on a display unit (not illustrated) such as a monitor included in the computer 101. The application is used for generating image data to be printed and inputting the image data to the image forming apparatus and is realized by the CPU reading a program stored in a storage device such as the HDD onto the RAM, loading, and executing the program. The HDD, CPU, and RAM are included in the computer 101. The CPU controls the entire operation of the computer 101.

In FIG. 3, a user sets a color in a color setting area 301. The user can specify an arbitrary position in the color setting area 301 to set a color. For example, when the user clicks a part of a desired color in the color setting area 301 by a mouse, the color is set. A lightness setting area 302 is used to specify lightness corresponding to the color set in the color setting area 301. Lightness is specified by a triangle mark 303. Moving the triangle mark 303 upward in the lightness setting area 302 increases lightness, whereas moving the triangle mark 303 downward decreases lightness. For example, when the user clicks or drags the triangle mark 303 in the lightness setting area 302 using a mouse, the lightness is set.

Values of the respective CMYK components for representing the color set in the color setting area 301 and the lightness setting area 302 are displayed on component value display portions 304, 305, 306, and 307. For example, the component values of cyan, magenta, yellow, and black may be displayed on the component value display portions 304, 305, 306, and 307, respectively.

Values may be directly input to the component value display portions 304, 305, 306, and 307. If a value is input to the component value display portion, the color corresponding to the value input into the component value display portion is specified in the color setting area 301, and the triangle mark 303 is moved to the lightness corresponding to the value input into the component value display portion in the lightness setting area 302.

An OK button 308 is pressed to set the color and the lightness specified in the color setting screen in FIG. 3. A cancel button 310 is pressed to cancel the setting of the color and the lightness specified in the color setting screen in FIG. 3.

Alternatively, the user may select a color from the color sample in the computer 101. A button 309 may be used for selecting a color setting screen using the color sample. When the button 309 is pressed, the display can be changed to the color setting screen using the color sample.

FIG. 4 illustrates an example of the color setting screen using the color sample. The color sample is a list used in the bookbinding industry and the publishing industry, in which predetermined colors are associated with numbers. A printing color (corresponding to an amount of cyan, magenta, yellow, and black) can be specified by the number.

A color sample display portion 401 displays correspondence between a color and a number representing the color. FIG. 4 displays five colors and numbers in the color sample display portion 401; however, a scroll bar 402 may be moved upward or downward to allow other colors to be displayed. In FIG. 4, the color of No. 305 is selected in the color sample display portion 401, as shown by its bolded appearance. Other forms designating selection, or distinguishing a selected item from other options, including highlighting, greying out non-selected items, selections appearing to be raised or lowered, etc. may be used.

A color component value display portion 403 displays the CMYK component values of the color selected in the color sample display portion 401. The component values are displayed in numerical percentages in FIG. 4, but may also be displayed in ratio form and other numerical, graphical or representative forms.

Since the color of No. 305 is selected in the color sample display portion 401, the color component values of No. 305 are displayed in FIG. 4.

When an OK button 404 is pressed, the color specified in the color setting screen in FIG. 4 is set, and the color setting ends. When a cancel button 405 is pressed, the setting of the color and the lightness specified in the color setting screen in FIG. 4 is canceled, and the display returns to the previous screen (FIG. 3).

According to the present exemplary embodiment, the portion where a color is set using the color sample illustrated in FIG. 4 is taken as the special color specification area, among the image data generated by the computer 101, and subjected to the inspection processing different from that in other areas. More specifically, the tint inspection processing is performed if there is a small difference in the tint between the scan image data that the print product read, as illustrated in FIG. 2, and the reference image data generated by the computer 101. Accordingly, (since a difference in the tint is small between the relevant data and the reference image data) the color set using the color sample is subjected to the tint inspection processing which is higher in accuracy than that in other areas. The present exemplary embodiment changes the operation of the tint inspection processing performed on the color set using the color sample, however, not only the color set using the color sample but also the color set by the user specifying a special color toner or a special color ink may be subjected to tint inspection processing.

According to the present exemplary embodiment, the inspection processing in the special color specification area and in the area other than the special color specification area is changed. Accordingly, the special color specification area is subjected to the inspection processing assuring that the special color specification area is higher in color reproducibility than the area other than the special color specification area.

In general, human eyes are sensitive to brightness but insensitive to difference in color; the human eye has fairly little spatial sensitivity to color. Thus, the accuracy of the brightness information of data having a luminance channel or component has far more impact on the image detail discerned by the human eye than other (for example, color) channels or components. For this reason, if the tint inspection is conducted using color space data without a pixel value corresponding to degree of brightness, such as RGB data (a pixel value represented by an RGB color space), human eyes may perceive that brightness of an inspected print product is different from the reference image data (original image), even if the print product has been determined to be acceptable as a result of the tint inspection. Instead, human eyes may perceive that even the print product determined as unacceptable has no difference in tint from the reference image data. In a second exemplary embodiment described below, color space data with a pixel value corresponding to degree of brightness (Yuv color space, for example) is used as the data of color space, with a brightness component axis (a luminance axis, for example) as a constitution axis.

In the tint inspection processing performed in the inspection controller 111, the scan image data and the reference image data are represented by a brightness component (Y) and color difference components (u and v), and the tint inspection is performed using the Y, u, and v data pieces representing differences of each component between the scan image data and the reference image data. Accordingly, the tint inspection can be performed in a state where an acceptable or an inacceptable determination result in the inspection is close to human-perceivable visual characteristic(s).

The RGB data needs to be converted into Yuv data in order to perform the tint inspection using the Yuv data (the pixel value represented by the Yuv color space). According to the present exemplary embodiment, the tint inspection using the Yuv data is performed only in the special color specification area, and the tint inspection using the RGB data is performed in the other areas, as was the case with the first exemplary embodiment. Therefore, the tint inspection using the Yuv data is closer to or better approximates the human's visual characteristic than the tint inspection using the RGB data.

Figure 5:
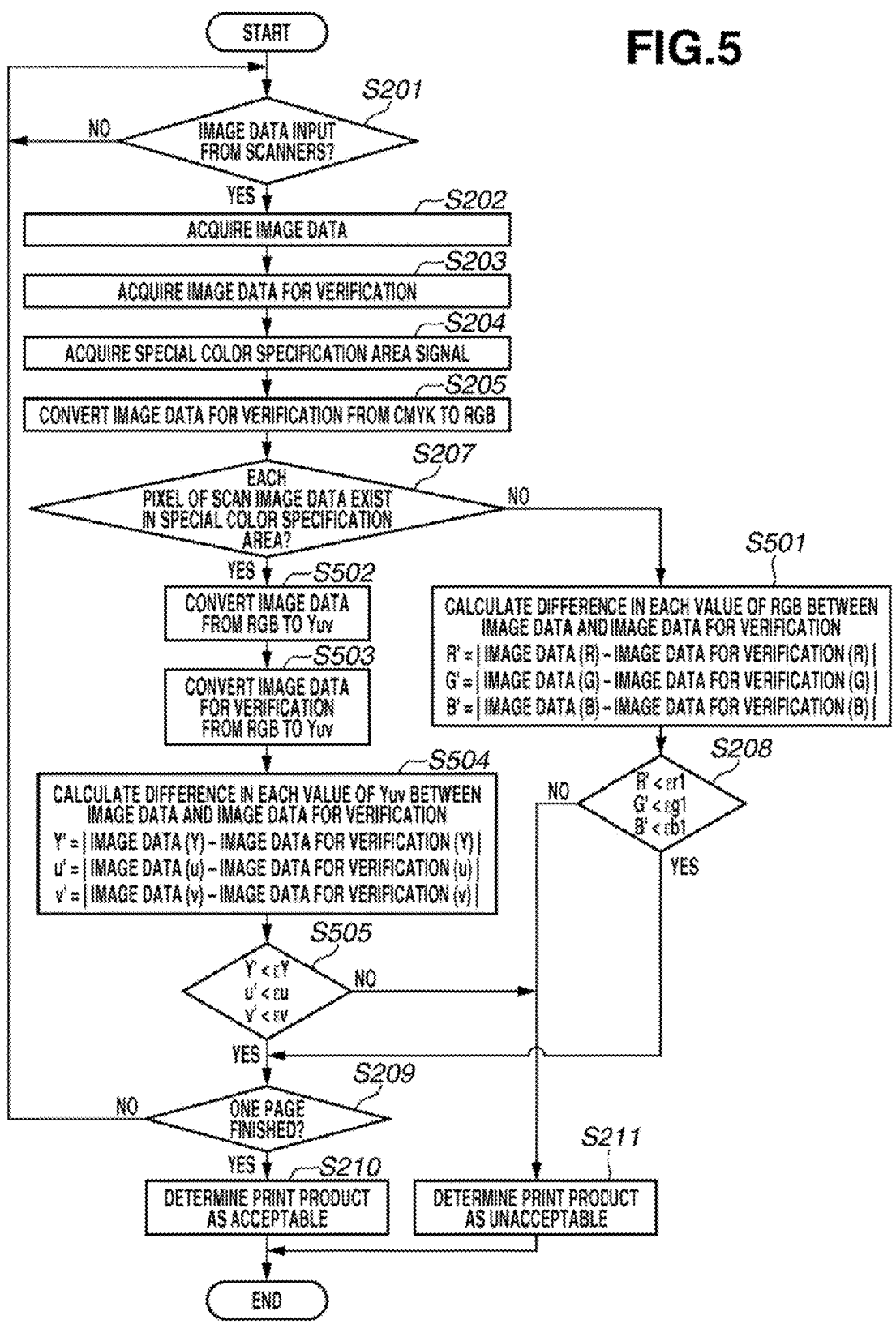
FIG. 5 is a flow chart illustrating tint inspection processing of an inspection controller 111 according to a second exemplary embodiment.

FIG. 5 is a flow chart illustrating the tint inspection processing performed by the inspection controller 111 according to the second exemplary embodiment. The steps similar in operation to those in the first exemplary embodiment in FIG. 2 are given the same reference numerals in FIG. 2. Accordingly, the descriptions provided above regarding FIG. 2 may be referred to and are not repeated with respect to FIG. 5.

In step S207 in FIG. 5, if the image data does not exist in the special color specification area (or, the special color specification area signal=0) as a result of referring to the special color specification area signal (NO in step S207), the processing proceeds to step S501. In step S501, differences R', G', and B' of each data between the image data and the reference data are calculated as is the case with the operation in step S206 in FIG. 2. In step S208, it is determined whether the differences of RGB data pieces are smaller than $\epsilon r1$, $\epsilon g1$, and $\epsilon b1$, respectively.

However, if in step S207 the image data exists in the special color specification area (or, the special color specification area signal=1) as a result of referring to the special color specification area signal (YES in step S207), the processing proceeds to step S502. In steps S502 and S503, the inspection controller 111 converts the image data and the reference image data from the RGB data to the Yuv data.

In step S504, the Yuv data of the image data and the reference image data are compared with each other to calculate the difference (difference value) of each pixel. When the difference of the Y data is taken as Y', the difference of the u data is taken as u', and the difference of the v data is taken as v', the difference is represented by the following equation(s):

$$Y'=|Y \text{ data of image data} - Y \text{ data of reference image data}| \quad \text{Equation 5a}$$

$$u'=|u \text{ data of image data} - u \text{ data of reference image data}| \quad \text{Equation 5b}$$

$$v'=|v \text{ data of image data} - v \text{ data of reference image data}| \quad \text{Equation 5c}$$

Whether the scan image data is acceptable or not is determined based on the difference values as comparison results obtained by the comparison processing.

After the difference of each data is calculated in step S504, in step S505 the inspection controller 111 determines whether the differences of the Yuv data pieces are smaller than $\epsilon Y$, $\epsilon u$, and $\epsilon v$, respectively, where $\epsilon Y$, $\epsilon u$, and $\epsilon v$ are thresholds for the Y data, u data, and v data in the tint inspection processing. The print product is thus determined as acceptable if the differences between the image data and the reference image data are less than the thresholds $\epsilon Y$, $\epsilon u$, and $\epsilon v$.

In step S505, if the differences Y', u', and v' between the image data and the reference image data satisfy the criterion represented by Equation 6, then it is determined that the image data acquired in step S202 is printed in the tint within the predetermined range. Then, the inspection controller 111 ends the tint inspection processing for the pixel in the special color specification area.

$$Y'<\epsilon Y, u'<\epsilon u, \text{ and } v'<\epsilon v \quad \text{Equation 6}$$

If the condition represented by Equation 6 is not satisfied (NO in step S505), then in step S211 the inspection controller 111 determines that the image data acquired in step S202 is not printed in the tint within the predetermined range and the print product subjected to the tint inspection is unacceptable. Then, the inspection controller 111 ends the inspection processing.

According to the second exemplary embodiment, the above described operation enables the inspection controller 111 to perform the inspection using a basis in which results of determining whether the print product is acceptable or not are closer to or better approximate human-perceivable visual characteristic(s), by comparing the scan image data with the reference image data in the special color specification area using the Yuv space data. In other words, the special color specification area is subjected to the inspection processing assuring in terms of human visual sense, such that the special color specification area is higher in color reproducibility than the area other than the special color specification area.

Further, according to the present exemplary embodiment, only the special color specification area of the scan image data is converted into the Yuv data, so that processing time can be made shorter than in a case where all the scan image data pieces are converted into the Yuv data to perform the inspection processing.

The present exemplary embodiment uses a brightness component (Y) and the Yuv color space of color difference components (u and v) as a basis of comparison as a tint inspection target. However, the present invention is not limited to this configuration. The basis of comparison for the comparison processing in the special color specification area has only to be a basis closer to or more approximate of human-perceivable visual characteristic(s) than the basis of comparison for the comparison processing in the area other than the special color specification area. For example, similar effect(s) can be obtained by performing the tint inspection processing using a color space with a brightness component, such as an HSL color space of hue (H), saturation (S), and luminance (L), or an HSV color space of hue (H), saturation (S), and lightness (V) as a basis of comparison in the special color specification area. Any color space having a brightness or luminescence component may potentially be used for processing. Other contemplated bases include YIQ, YDbDr, YPbPr, YCbCr, xvYCC, etc. The comparison in the area other than the special color specification area may be performed using not only RGB data, but may also be performed using data of the CMYK color space without a brightness component, or of other color space(s) without a brightness component.

In the first exemplary embodiment, the special color specification area and the area other than the special color specification area are subjected to the tint inspection processing.

In a third exemplary embodiment, the tint inspection processing performed by the inspection controller 111 is restricted to the special color specification area to reduce the processing time required for the tint inspection processing performed for the entire scan image data.

Figure 6:
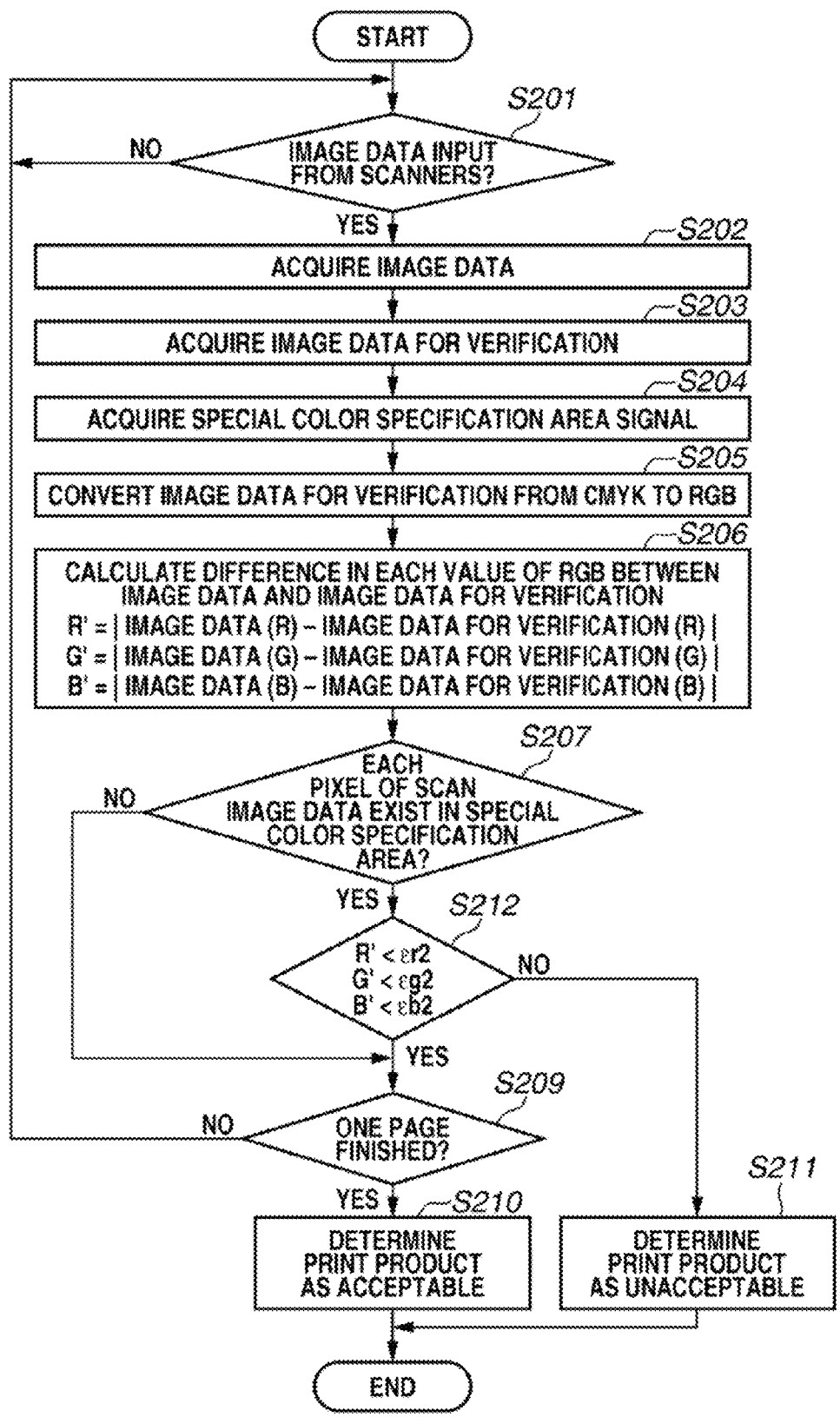
FIG. 6 is a flow chart illustrating tint inspection processing of an inspection controller 111 according to a third exemplary embodiment.

FIG. 6 is a flow chart illustrating the tint inspection processing performed by the inspection controller 111 according to the present exemplary embodiment. The flow chart is described below compared with that of the first exemplary embodiment in FIG. 2.

In step S207 in FIG. 6, the inspection controller 111 refers to the special color specification area signal acquired in step S204 and determines whether the pixel as the inspection target in the scan image data acquired in step S202 exists in the special color specification area.

In the case of the first exemplary embodiment shown in FIG. 2, if the pixel does not exist in the special color specification area (the special color specification area signal=0) as a result of referring to the special color specification area signal (NO in step S207), the processing proceeds to step S208. In step S208, the difference values of the RGB data between the scan image data and the reference image data in pixel position are compared with the thresholds $\epsilon r1$, $\epsilon g1$, and $\epsilon b1$ to perform the tint inspection processing. On the other hand, in the present exemplary embodiment shown in FIG. 6, if it is determined that the pixel does not exist in the special color specification area, the processing proceeds to step S209 without performing the tint inspection processing (comparison of the difference values between the scan image data and the reference image data with the thresholds) to determine whether the tint inspection processing is finished for image data of one page.

If the image data exists in the special color specification area (the special color specification area signal=1) as a result of referring to the special color specification area signal (YES in step S207), then in step S212, the tint inspection processing is performed similar to that in FIG. 2.

According to some aspects of the present exemplary embodiment, the inspection controller 111 performs the tint inspection processing only in the special color specification area by the above described operation, so that the time required for the tint inspection processing performed on one page can be reduced.

Further, according to other aspects of the present exemplary embodiment, only the special color specification area is inspected. Thus, the special color specification area is subjected to the inspection processing, thereby assuring that the special color specification area is higher in color reproducibility than the area other than the special color specification area.

Aspects of the present invention can also be realized by a computer of a system or apparatus (or devices such as a CPU or a MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-132280 filed Jun. 14, 2011, which is hereby incorporated by reference herein in its entirety.

What is claimed is:

1. An inspection apparatus comprising:
   a reading unit configured to read a print product printed by an image forming apparatus to acquire a scan image;
   an acquiring unit configured to acquire a reference image with a plurality of object areas as a reference to the scan image; and
   a determination unit configured to determine, according to a criterion, whether the print product is acceptable by comparing the scan image with the reference image in the plurality of the object areas,
   wherein the criterion with respect to a special color specification area among the plurality of the object areas is stricter than the criterion with respect to an object area other than the special color specification area.

2. The inspection apparatus according to claim 1, further comprising:
   a reception unit configured to receive information for identifying the special color specification area from the plurality of the object areas,
   wherein the special color specification area comprises an area in which a color in an object area is set by selecting the color from a color sample based on a user's specification, and
   wherein the determination unit determines whether the print product is acceptable based on the information received by the reception unit.

3. The inspection apparatus according to claim 1,
   wherein the determination unit acquires a difference value by comparing pixel values of the scan image and the reference image, and determines that the print product is acceptable if the acquired difference value is smaller than a threshold or unacceptable if the acquired difference value is equal to greater than the threshold, and
   wherein a threshold with respect to the special color specification area is smaller than a threshold as the criterion with respect to the object area other than the special color specification area.

4. The inspection apparatus according to claim 1, further comprising:
   a conveyance unit configured to convey the print product printed by the image forming apparatus from the image forming apparatus to a reading position of the reading unit.

5. An inspection apparatus comprising:
   a reading unit configured to read a print product printed by an image forming apparatus to acquire a scan image;
   an acquiring unit configured to acquire a reference image with a plurality of object areas as a reference to the scan image; and
   a determination unit configured to determine whether the print product is acceptable by comparing the scan image with the reference image in the plurality of the object areas,
   wherein the comparison processing by the determination unit in a special color specification area among the plurality of the object areas is performed by a basis that closely approximates human visual characteristics.

6. The inspection apparatus according to claim 5, wherein the comparison processing by the determination unit in an object area other than the special color specification area is not performed by a basis that closely approximates human visual characteristics.

7. The inspection apparatus according to claim 5, wherein the determination unit uses a color space with an axis of a brightness component as a basis of comparison for comparison processing in the special color specification area, and uses a color space without the brightness component as a basis of comparison for comparison processing in the object area other than the special color specification area.

8. An inspection apparatus comprising:
a reading unit configured to read a print product printed by an image forming apparatus to acquire a scan image;
an acquiring unit configured to acquire a reference image with a plurality of object areas as a reference to the scan image; and
a determination unit configured to determine whether the print product is acceptable by comparing the scan image with the reference image only in a special color specification area among the plurality of the object areas.

9. An image forming apparatus comprising:
a print data reception unit configured to receive print data for printing an image with a plurality of object areas;
a print unit configured to print the image based on the print data and output a print product;
a detection unit configured to analyze a rendering command corresponding to the object area in the print data and detect a special color specification area in which a color in the object area is set by selecting the color from a color sample based on a user's specification;
a conveyance unit configured to convey the print product printed by the print unit to an inspection apparatus configured to determine whether the print product is acceptable;
an image transmission unit configured to transmit an image with the plurality of the object areas as a reference image to be compared with a scan image acquired by a reading unit reading the print product to the inspection apparatus; and
an information transmission unit configured to transmit information indicating whether each of the plurality of the object areas included in the image is a special color specification area based on detection results by the detection unit to the inspection apparatus.

10. A method for performing inspection, the method comprising:
causing a reading unit to read a print product printed by an image forming apparatus to acquire a scan image;
causing an acquiring unit to acquire a reference image with a plurality of object areas as a reference to the scan image; and
causing a determination unit to determine whether the print product is acceptable by comparing the scan image with the reference image in the plurality of the object areas,
wherein a determination criterion of determination executed by the determination unit with respect to a special color specification area among the plurality of the object areas is stricter than a determination criterion with respect to an object area other than the special color specification area.

11. A non-transitory computer-readable medium storing a program for causing a computer to execute the method according to claim 10.

12. A method for performing inspection, the method comprising:
causing a reading unit to read a print product printed by an image forming apparatus to acquire a scan image;
causing an acquiring unit to acquire a reference image with a plurality of object areas as a reference to the scan image; and
causing a determination unit to determine whether the print product is acceptable by comparing the scan image with the reference image in the plurality of the object areas,
wherein the comparison processing by the determination unit in a special color specification area among the plurality of the object areas is performed by a basis closer to a human visual characteristic than the comparison processing by the determination unit in an object area other than the special color specification area.

13. A method for performing inspection, the method comprising:
causing a reading unit to read a print product printed by an image forming apparatus to acquire a scan image;
causing an acquiring unit to acquire a reference image with a plurality of object areas as a reference to the scan image; and
causing a determination unit to determine whether the print product is acceptable by comparing the scan image with the reference image only in a special color specification area among the plurality of the object areas.

14. A method for forming an image, the method comprising:
causing a print data reception unit to receive print data for printing an image with a plurality of object areas;
causing a print unit to print the image based on the print data and output a print product;
causing a detection unit to analyze a rendering command corresponding the object area in the print data and detect a special color specification area in which a color in the object area is set by selecting the color from a color sample based on a user's specification;
causing a conveyance unit to convey the print product printed by the print unit to an inspection apparatus configured to determine whether the print product is acceptable;
causing an image transmission unit to transmit an image with the plurality of the object areas as a reference image to be compared with a scan image acquired by reading the print product to the inspection apparatus; and
causing an information transmission unit to transmit information indicating whether each of the plurality of the object areas included in the image is a special color specification area detected by the detection unit.

* * * * *